US009600288B1

(12) United States Patent
Potter et al.

(10) Patent No.: US 9,600,288 B1
(45) Date of Patent: Mar. 21, 2017

(54) RESULT BYPASS CACHE

(75) Inventors: Terence M. Potter, Austin, TX (US);
Timothy A. Olson, Austin, TX (US);
James S. Blomgren, Austin, TX (US);
Robert A. Drebin, Palo Alto, CA (US);
Douglas C. Youngwith, Austin, TX
(US); Jon A. Loschke, Austin, TX (US)

(73) Assignee: Apple Inc., Cupertino, CA (US)

( * ) Notice: Subject to any disclaimer, the term of this patent is extended or adjusted under 35 U.S.C. 154(b) by 892 days.

(21) Appl. No.: 13/465,372

(22) Filed: May 7, 2012

Related U.S. Application Data

(60) Provisional application No. 61/509,051, filed on Jul. 18, 2011.

(51) Int. Cl.
*G06F 9/38* (2006.01)

(52) U.S. Cl.
CPC ............ *G06F 9/383* (2013.01); *G06F 9/3824* (2013.01)

(58) Field of Classification Search
CPC ...................................... G06F 9/383
USPC ....................................... 712/218
See application file for complete search history.

(56) References Cited

U.S. PATENT DOCUMENTS

| | | | |
|---|---|---|---|
| 5,668,975 A | 9/1997 | Coddington | |
| 5,790,823 A * | 8/1998 | Puzak et al. | 712/207 |
| 5,956,747 A * | 9/1999 | Wilhelm et al. | 711/140 |
| 6,272,601 B1 | 8/2001 | Nunez et al. | |
| 6,615,340 B1 * | 9/2003 | Wilmot, II | G06F 9/3004 |
| | | | 712/209 |
| 2002/0124155 A1 * | 9/2002 | Sami | G06F 9/3826 |
| | | | 712/218 |
| 2004/0225838 A1 * | 11/2004 | Biles | 711/118 |
| 2005/0172091 A1 | 8/2005 | Rotithor et al. | |
| 2009/0182948 A1 * | 7/2009 | Jiao et al. | 711/133 |
| 2010/0161948 A1 * | 6/2010 | Abdallah | 712/228 |
| 2010/0211742 A1 | 8/2010 | Turullols et al. | |

FOREIGN PATENT DOCUMENTS

WO 2010/069398 6/2010

OTHER PUBLICATIONS

Hennessy and Patterson, "Computer Architecture—A Quantitative Approach, 4th Edition", 2007, pp. 197, A-19, C-10.*

(Continued)

*Primary Examiner* — Andrew Caldwell
*Assistant Examiner* — Michael Metzger
(74) *Attorney, Agent, or Firm* — Rory D. Rankin; Meyertons, Hood, Kivlin, Kowert & Goetzel, P.C.

(57) ABSTRACT

A system and method for efficiently accessing operands in a datapath. An apparatus includes a data operand register file and an execution pipeline with multiple stages. In addition, the apparatus includes a result bypass cache configured to store data results conveyed by at least the final stage of the execution pipeline stage. Control logic is included which is configured to determine whether source operands for an instruction entering the pipeline are available in the last stage of the pipeline or in the result bypass cache. If the source operands are available in the last stage of the pipeline or the result bypass cache, they may be obtained from one of those locations rather than reading from the register file. If the source operands are not available from the last stage or the result bypass cache, then they may be obtained from the data operand register file.

25 Claims, 8 Drawing Sheets

(56) References Cited

OTHER PUBLICATIONS

Timothy M. Jones et al, "Compiler Directed Early Register Release", 2005, 10 pages.*

Z. Wang et al. "Using the Compiler to Improve Cache Replacement Decisions." Proceedings of the Intl. Conf. on Parallel Architectures and Compilation Techniques, Sep. 2002. 10 pages.*

Jongsun Kim, et al., "A Cost-Effective Latency-Aware Memory Bus for Symmetric Multiprocessor Systems", IEEE Transactions on Computers, vol. 57, No. 12, Dec. 2008, 7 pages.

\* cited by examiner

RESULT BYPASS CACHE

CROSS REFERENCE TO RELATED APPLICATION

This patent application claims priority to Provisional Patent Application Ser. No. 61/509,051, filed Jul. 18, 2011, which is incorporated herein by reference in its entirety.

BACKGROUND OF THE INVENTION

Field of the Invention

This invention relates to computing systems, and more particularly, to efficiently accessing operands in a processing datapath.

Description of the Relevant Art

Compilers may extract parallelized tasks from program code to execute in parallel on the system hardware. The parallelization of tasks within the program code is used to increase the throughput of computer systems. Computational intensive parallel tasks may include cryptography, video graphics rendering and garbage collection. Particular instructions for these tasks may use a disproportionate share of a shared resource, which delays a deallocation of the shared resource. Due to the inefficient usage of the shared resources, both single-core and multi-core general-purpose processors may not efficiently execute these parallel tasks. To overcome the performance limitations of conventional general-purpose cores, a computer system may utilize one or more cores with a single instruction multiple data (SIMD) parallel micro-architecture. Typically, general-purpose processors are designed to exploit parallelism in an instruction stream. The SIMD cores are typically designed to exploit parallelism in a data stream.

Specialized processor cores that utilize a SIMD parallel micro-architecture include digital signal processors (DSPs), graphics processing units (GPUs), and so forth. These SIMD cores may be found in video game consoles, smart phones, audio/video A/V) editing workstations, portable tablet computers, portable media players, and so forth. A vital issue for modern integrated circuits (ICs) within portable computers, mobile communication devices, and desktop systems is power consumption. As power consumption increases, more costly cooling systems are utilized to remove excess heat. These cooling systems may include larger heat sinks and operation mode control logic, which increase design complexity and system cost. In addition, battery life for devices is reduced as energy consumption increases.

A parallel data path within a SIMD core may be pipelined. Ideally, every clock cycle produces useful execution of an instruction for each stage of the pipeline. In order to increase the probability of useful execution for each stage, a SIMD core may interleave instructions from different software threads within the pipeline. Parallel tasks as listed above typically include several software threads that may be scheduled on a SIMD core. Data operands for the multiple threads are located in an instruction stream register file, which may also be referred to as an operand storage area. This operand storage area is sufficiently large that a random access memory (RAM) is used to store the data, rather than registers. The RAM may be banked to provide pseudo-multi-porting that allows multiple read and write operations to occur concurrently. The large RAM and associated banking logic increases the energy consumed to perform read and write operations for data operands. In addition, when any two operations conflict for a bank, a stall in the pipeline results from resolving the conflict.

In view of the above, efficient methods and mechanisms for accessing operands in a processor are desired.

SUMMARY OF EMBODIMENTS OF THE INVENTION

Systems and methods for efficiently accessing operands in a processor are contemplated.

In various embodiments, an apparatus is contemplated that includes a data operand register file and an execution pipeline with multiple stages. In addition, the apparatus includes an operand cache configured to store data results conveyed by at least the final stage of the execution pipeline stage and one or more incoming instruction operands. Control logic is included which is configured to determine whether source operands for an instruction entering the pipeline are available in the last stage of the pipeline or in the operand cache. If the source operands are available in the last stage of the pipeline or the operand cache, they may be obtained from one of those locations rather than reading them from a register file. If the source operands are not available from the last stage or the operand cache, then they may be obtained from the data operand register file. In various embodiments, the operand cache is smaller than the register file and consumes less power than the register file. Reducing the number of reads from the data operand register file may reduce power consumption, which may in turn extend the battery life of devices that utilize a battery.

In addition to the above, embodiments are contemplated in which instructions from multiple threads are interleaved within the pipeline. In an embodiment in which the pipeline includes N stages, at least N threads may be interleaved. In embodiments in which an access to the operand register file has a latency of M cycles, N+M threads may be interleaved in the pipeline. These and other embodiments are contemplated and are described herein.

Figure 1:
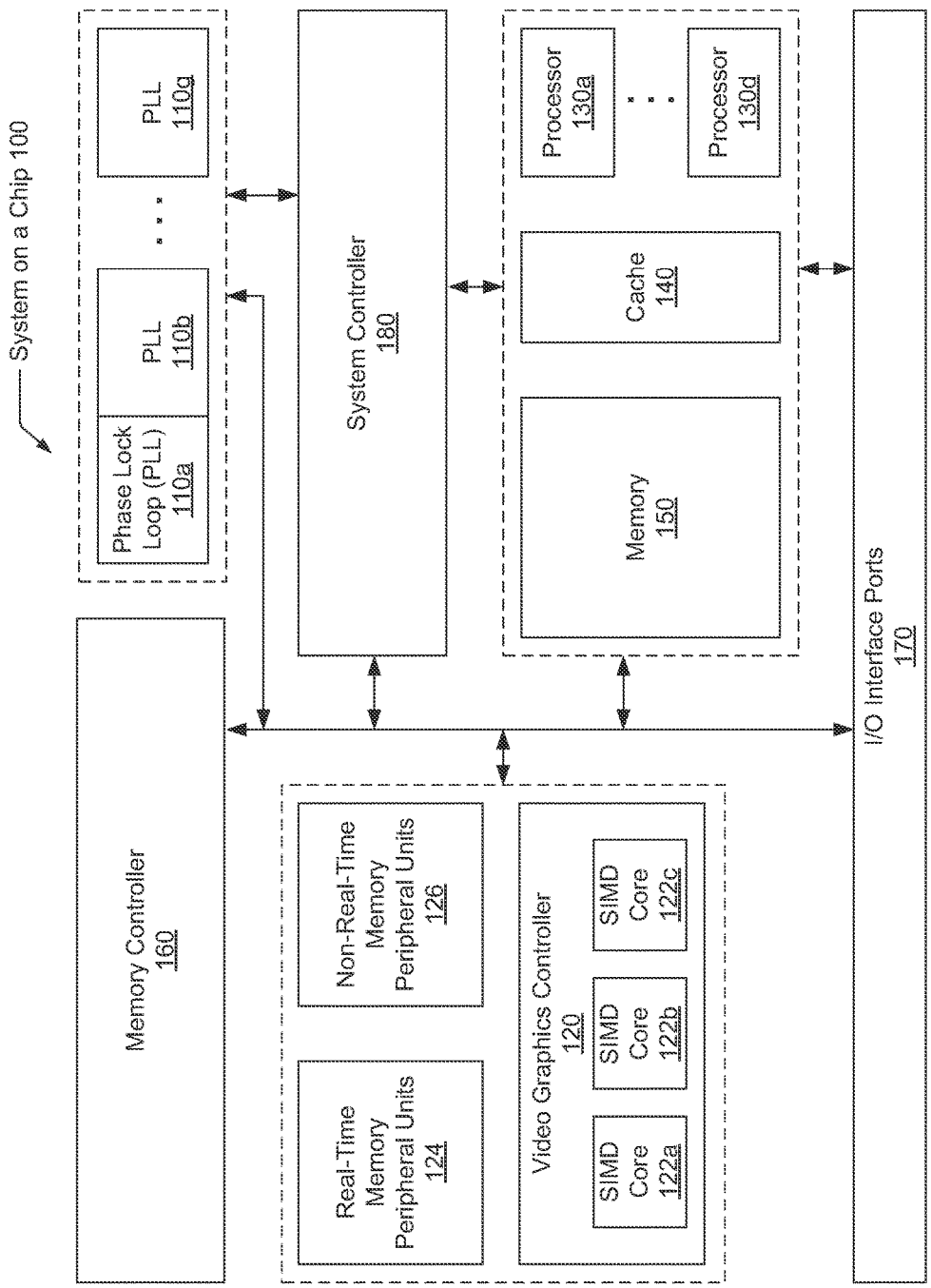
FIG. 1 is a generalized block diagram of one embodiment of a system-on-a-chip (SOC).

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a system-on-a-chip (SOC) 100 is shown. The SOC 100 integrates multiple functions into a single integrated chip substrate to meet increasing processing demands of embedded system applications. The functions may include digital, analog, mixed-signal and radio-frequency (RF) functions. The multiple processing cores and computation units on the SOC interact with one another. The SOC 100 is an integrated circuit (IC) that includes these multiple types of IC designs on a single semiconductor die, wherein each IC design provides a separate functionality. For example, a video graphics controller may include one or more graphics processing units (GPUs). Each of these GPUs may include a single-instruction-multiple-data (SIMD) core. It is noted that while the description herein may generally discuss methods and mechanisms within the context of SIMD processing cores, this discussion is not intended to be limiting. Rather, it is to be understood that the methods and mechanisms described herein are applicable in non-SIMD contexts as well.

Traditionally, each one of the types of IC designs may have been manufactured on a separate silicon wafer. In the illustrated embodiment, the SOC 100 includes one or more clock sources, such as phase lock loops (PLLs) 110a-110g, a memory controller 160, a video graphics controller 120 that includes SIMD cores 122a-122c, and various input/output (I/O) interfaces 170. In addition, the SOC 100 may include a memory 150, which may be a non-volatile memory, and one or more processors 130a-130d with a supporting cache hierarchy that includes at least cache 140. Further, the SOC 100 may include other various analog, digital, mixed-signal and radio-frequency (RF) blocks. For example, the SOC 100 may include real-time peripheral memory units 124 and non-real-time memory peripheral units 126. In order to process applications in an energy-efficient manner on the SOC 100, a central power manager may be included within the system controller 180. The system controller 180 may also coordinate communication among the various units on the SOC 100. Communication buses, a clock tree and other signal routing across the SOC 100 is not shown for ease of illustration.

Media-processing applications may be executed on an embedded system that includes the SOC 100. These media-processing applications may include processing large amounts of data within tight time constraints, often in real-time. The media-processing applications typically contain a large amount of data-parallelism. Additionally, providing a large number of computation units to operate on data in parallel is relatively inexpensive. The large number of computation units includes arithmetic logic units (ALUs). Geometric dimensions of devices and metal routes on each generation of semiconductor cores are decreasing. In one example, hundreds of 32-bit adders (or more) may fit within an area of on-die real estate reserved for execution units.

Single-instruction-multiple-data (SIMD) cores typically include a large number of computation units for handling data-level parallelism (DLP). The DLP within applications allows a same operation or task to be applied simultaneously on several different pieces of data. The SIMD cores 122a-122c within the video graphics controller 120 may contain multiple computation units. As a result, the SIMD cores 122a-122c may exploit DLP within applications. Other SIMD cores (not shown) within the SOC 100 may also exploit DLP within the media-processing applications.

The media-processing applications may include signal processing, image and audio compression and decompression, stereo depth extraction, 2D- and 3D-graphics rendering (3D polygon rendering), and so forth. Rendering systems include shaders that calculate various aspects of a generated image, such as lighting, color, and so forth. The rendering system spends a majority of time performing shading. In addition, the tight time constraints places pressure on SIMD cores within the SOC 100 to provide high-performance per unit area and unit power.

In one embodiment, one or more SIMD cores within the SOC 100 concurrently execute multiple software threads. It is noted that while the following discussion generally uses SIMD based examples, the methods and mechanisms described herein are applicable to other non-SIMD based processors and devices as well. Data operands for the multiple threads may be located in an instruction stream register file, which may also be referred to as an operand storage area. This operand storage area is sufficiently large that, in one embodiment, a random access memory (RAM) is used to store the data, rather than registers. In one embodiment, this RAM may be banked to provide pseudo-multi-porting that allows multiple read and write operations to occur concurrently. The large RAM and associated banking logic increases the energy consumed by a SIMD core to perform read and write operations for data operands. In addition, when any two operations conflict for a bank, a stall in the pipeline results from resolving the conflict.

A datapath within a SIMD core typically hides instruction latency by interleaving execution of instructions from multiple different software threads. Each pipeline stage within the SIMD core may concurrently execute one instruction at a time from one of multiple available software threads. The SIMD core may include bypass control logic. For an N-stage pipeline, wherein N is an integer, the bypass control logic may determine whether identifiers for operands to be read from the operand storage area match identifiers for results to be written to the operand storage area N cycles later. If one or more matches are found, then the one or more associated operands may be read from bypass muxes, rather than from the operand storage area. The forwarded data includes one or more results from the youngest instruction of the older (in-program-order) instructions within a same thread. In this manner, less energy is consumed to provide operands to instructions when the operands are from a prior instruction in a same thread. In addition, fewer read operations are performed in the operand storage area. Fewer read operations reduce a number of dynamic stalls in the pipeline. Before continuing with more details of the operand bypass mechanism within a SIMD core, a further description of the SOC 100 is provided below.

The PLLs 110a-110g may supply source clock signals, which are routed through a clock tree (not shown) to be distributed across the die of the SOC 100 and to provide core clocks to the various processing blocks (general-purpose processing cores, SIMD cores, and so forth) on the SOC 100. The SOC 100 may use one or more types of PLLs to generate the source clocks signals. For example, an integer PLL may be used. Alternatively, a fractional PLL may be used to generate multiple clock signals with different clock frequencies from a single clock crystal. The number of clock signals provided on the SOC 100 is a design choice and may depend on a number of clocks signals used by the processing blocks on the SOC 100. As integration on the SOC 100 increases, so does the number of clock signals to source and to route.

Each one of the processors 130a-130d may include one or more cores and one or more levels of a cache memory subsystem. Each core may support the out-of-order execution of one or more threads of a software process and include a multi-stage pipeline. Each one of the processors 130a-130d may include circuitry for executing instructions according to a predefined general-purpose instruction set. For example, the PowerPC® instruction set architecture (ISA) may be selected. Alternatively, the x86, x86-64®, Alpha®, MIPS®, PA-RISC®, SPARC® or any other instruction set architecture may be selected.

Generally, each of the one or more cores within each of the processors 130a-130d accesses an on-die level-one (L1) cache within a cache memory subsystem for data and instructions. The processors 130a-130d may include multiple on-die levels (L2, L3 and so forth) of caches. If a requested block is not found in the on-die caches or in the off-die cache 140, then a read request for the missing block may be generated and transmitted to the memory 150. The memory 150 may be a non-volatile memory block formed from an array of flash memory cells and a memory controller (not shown) for the array. Alternatively, the memory 150 may include other non-volatile memory technology. The memory 150 may be divided into separate addressable arrays to be used by the processors 130a-130d and other processing blocks on the SOC 100. Each addressable array may have its own memory controller. The number of data inputs and outputs and address inputs will depend on the size of the array used.

The processors 130a-130d may share the memory 150 with other processing blocks, such as graphics processing units (GPUs), application specific integrated circuits (ASICs), and other types of processor cores. Therefore, typical SOC designs utilize acceleration engines, or accelerators, to efficiently coordinate memory accesses and support coherency designs between processing blocks and peripherals. In a SOC design that includes multiple processors and processing blocks, these components communicate with each other to control access to shared resources. Memory coherence may be managed in software, in the system controller 180, or both. A bridge within the system controller 180 may also connect low-bandwidth, direct memory access (DMA)-capable input/output (I/O) devices to the memory 150 via an accelerator coherency port (ACP) on one or more of the processors 130a-130d. For off-chip memory requests, the memory controller 160 may be utilized.

A central power manager may be included in the system controller 180. This power manager may include power management policies for multiple processing blocks on the SOC 100. Each of the processing blocks may include internal power management techniques. However, to manage system-wide energy consumption, the power manager may alter one or more operating voltages and operating frequencies to the processing blocks on the SOC 100. The system controller 180 may manage power-up sequencing of the various processing blocks on the SOC 100 and control multiple off-chip devices via reset, enable and other signals conveyed through the I/O interface ports 170. The system controller 180 may also manage communication between the various processing blocks on the multiple buses on the SOC 100.

The video graphics controller 120 may include a display controller with analog and digital blocks and digital-to-analog converters (DACs) for bridging internal blocks to external display physical blocks. The units 124 may group processing blocks associated with real-time memory performance for display and camera subsystems. The units 124 may include image blender capability and other camera image processing capabilities. The units 124 may include display pipelines coupled to the display controller within the video graphics controller 120.

The units 126 may group processing blocks associated with non-real-time memory performance for image scaling, rotating, and color space conversion, accelerated video decoding for encoded movies, audio processing and so forth. The units 124 and 126 may include analog and digital encoders, decoders, and other signal processing blocks. The I/O interface ports 170 may include interfaces well known in the art for one or more of a general-purpose I/O (GPIO), a universal serial bus (USB), a universal asynchronous receiver/transmitter (uART), a FireWire interface, an Ethernet interface, an analog-to-digital converter (ADC), a DAC, and so forth.

Figure 2:
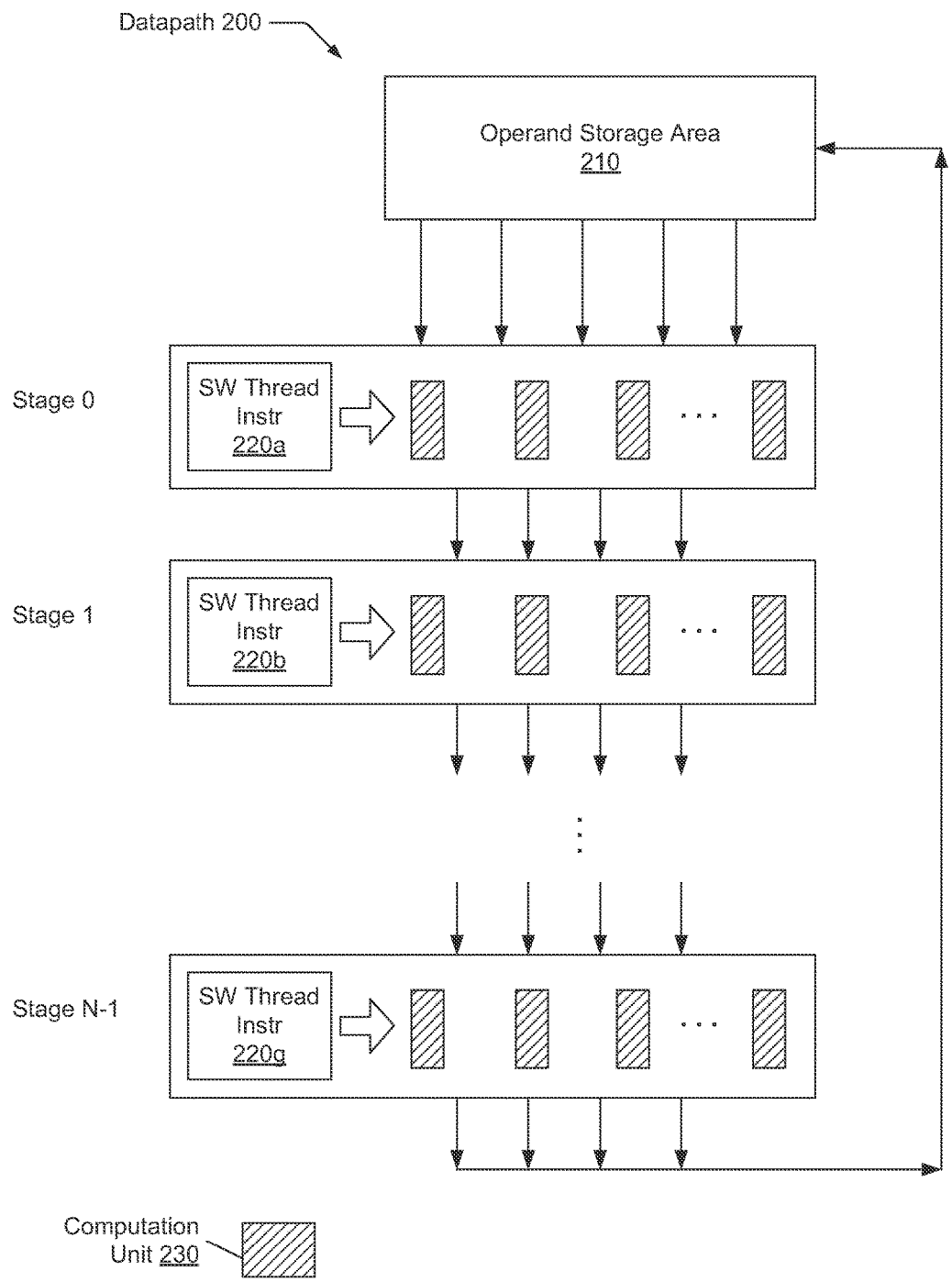
FIG. 2 is a generalized block diagram illustrating one embodiment of a single-instruction-multiple-data (SIMD) parallel datapath.

Turning now to FIG. 2, a generalized block diagram illustrating one embodiment of a datapath 200 is shown. The datapath 200 may include an operand storage area 210. The datapath 200 may support concurrent execution of computer program instructions in one or more execution pipeline stages. In the illustrated embodiment, there are N pipeline stages (Stage 0 to Stage N−1 in the figure), of the execution pipeline, wherein N is an integer. In an embodiment with a single execution pipeline stage, there would be no Stage N−1. In one embodiment, each stage of the one or more execution pipeline stages executes an instruction of a different thread than any other stage in the execution pipeline. Each stage may operate on an instruction of a separate, different software thread, such as instructions 220a-220g. Instructions from separate different software threads may be interleaved for pipelined execution in order to hide instruction latencies. One or more of the instructions may be a multi-cycle instruction utilizing multiple computation units. For example, a given thread may have an instruction that is a multiply-accumulate operation. A multiplier within stage 0 may be selected during execution of this operation. Afterward, an adder within stage 1 may be selected during execution of this operation in a next pipeline stage. While the adder within thread 1 is executing, selected computation units within stage 0, stage 2, and so forth may be executing concurrently for different software threads.

Each of the N stages may include multiple computation units for executing one of the instructions 220a-220g on several different data operands. Although the computation units are illustrated in a similar manner, each one may be different. Generally, a computation unit may include one or more of an integer ALU, shifters and rotators, a floating-point unit, and so forth. Pipeline registers may be used between stages 0 to N−1. Data operands may be read from the operand storage area 210 when execution of a given instruction begins. Intermediate results may be stored within the pipeline registers and propagate down the pipeline until used in an associated computation unit. Final results may be sent from stage N−1 to be written into the operand storage area 210.

In various embodiments, a software programmer may write a computer program that includes a collection of compute kernels, or function calls, and internal functions. The computer program may be mapped to a stream-programming model. This model decomposes applications into a set of computation kernels that operate on data streams, or records of data. Therefore, the data flow is a series of data streams. This mapping exposes the inherent locality and parallelism in the application. The data streams may be ordered, finite-length sequences of data records of an arbitrary type, wherein records within one stream may be of a same type. The inputs and outputs to compute kernels may be data streams. The non-local data that a compute kernel may reference at any time are the current head elements of its input streams and the current tail elements of its output streams. The datapath 200 may exploit the locality and parallelism of the series of data streams. In one embodiment, the datapath 200 may be a single-instruction-multiple-data (SIMD) datapath. Operands for the streams may originate in the operand storage area 210. After the pipeline stages execute the parallel data streams, the stream results are stored back to the operand storage area 210.

A software programmer may define the compute kernels, whereas the internal functions may be defined in a given library. For a data-parallel software application that may be executed within the datapath 200, an N-Dimensional computation domain may define an organization of an "execution domain". The N-Dimensional computation domain may also be referred to as an N-Dimensional grid or an N-Dimensional Range ("NDRange").

The NDRange may be a one-, two-, or three-dimensional space. Note that some embodiments may allow more than three-dimensional data. This dimensional space may also be referred to as an index space. For example, a software application may perform data processing on a two-dimensional (2D) array of data, such as an image file. The software application may perform an algorithm developed by a software programmer on a pixel-by-pixel basis of a 2D image or an element-by-element basis of a two-dimensional matrix. A given compute kernel may be invoked over the index space (the NDRange). In other embodiments, a software application may include an algorithm that utilizes data-parallel programming for electrostatic potentials mapping on a 3D lattice and direct coulomb summation used in macromolecular modeling. Data-parallel applications may be used in gaming, entertainment, science and medical fields.

A given instance of the compute kernel may be executed as its own software thread. A given instance of the compute kernel at a given point in the index space may be referred to as a "work item". A work item may also be referred to as a work unit. A work unit may operate with the one or more instructions in the compute kernel on a record of data corresponding to a given pixel (a given index) of the 2D image. Typically, work units have an associated unique identifier (ID). The record of data may be represented as the data operands being read from the operand storage area 210 and processed by the multiple computation units within each of the stages 0 to N−1 in datapath 200. In one example, the NDRange may define a number of 280 work units, but a GPU may support the simultaneous execution of 64 work units at any given time. The total number of work units may define a global work size.

The work units may be further grouped into work groups. Each work group may have a unique identifier (ID). The work units within a given work group may be able to communicate with each other and synchronize execution and coordinate memory accesses. A number of work units may be clustered into a wave front for simultaneous execution on a GPU in a SIMD manner. Regarding the example above for 280 total work units, a wave front may include 64 work units.

In one embodiment, a compute kernel is statically compiled when the computer program is compiled. In other frameworks, a compute kernel may be compiled with a Just-In-Time (JIT) method. The JIT method may generate an appropriate binary code after obtaining the system configuration. With a JIT compilation method, the compilation time is included with the total execution time. Therefore, compiler optimizations may increase the execution time.

Different frameworks typically have a difference in terminology between their respective execution models. For example, a work unit, a work group, a wave front and an NDRange in the OpenCL™ (Open Computing Language) framework have corresponding terms in other frameworks. Throughout the rest of the description, terms corresponding to OpenCL may be used. However, the systems and methods described may apply to other frameworks.

As described earlier, the operand storage area 210 may be implemented with a RAM. This RAM may utilize M cycles for a data operand read operation, wherein M is an integer. In addition, this RAM may utilize P cycles for a write operation, wherein P is an integer. In order to keep the pipeline full, N+M+P threads may be interleaved in the datapath 200. For example, if the RAM utilizes 3 cycles for a read operation and 2 cycles for a write operation and the execution pipeline has 4 stages, then the datapath 200 may have 3+2+4=9 separate available threads interleaved to remove any stalls or pipeline bubbles. The interleaving of threads may serve to hide instruction latencies.

Generally speaking, a processor consists of state and execution resources. An execution loop may include reading the state, executing an instruction, and writing the updated state. In general, this loop takes N+M+P cycles (N for the execution loop, M for reading operands and P for writing the state). This may be referred to as an N+M+P cycle pipeline. A software thread comprises a set of instructions, which may be executed serially, such that the state of the processor appears to be updated from one instruction before the next executes (this may be referred to as a "sequential execution model"). The hardware may be designed to execute multiple software threads concurrently. In order to execute N+M+P threads, the hardware includes N+M+P copies of the processor state, but may only include 1 copy of the execution resources.

If the hardware interleaves the N+M+P threads in the pipeline, then for any given thread, a new instruction is issued every N+M+P cycles, and the sequential execution model is maintained because the prior instruction has been allowed to complete. If reading the current state and writing the updated state are removed from the instruction latency, then only N separate available threads may be used to hide instruction latency. Additionally, if a number of times a data operand is read from the RAM is reduced, then the RAM operates less frequently and consumes less power. Similarly, if a number of times that results are written into the RAM is reduced, then the RAM operates less frequently and consumes less power.

Figure 3:
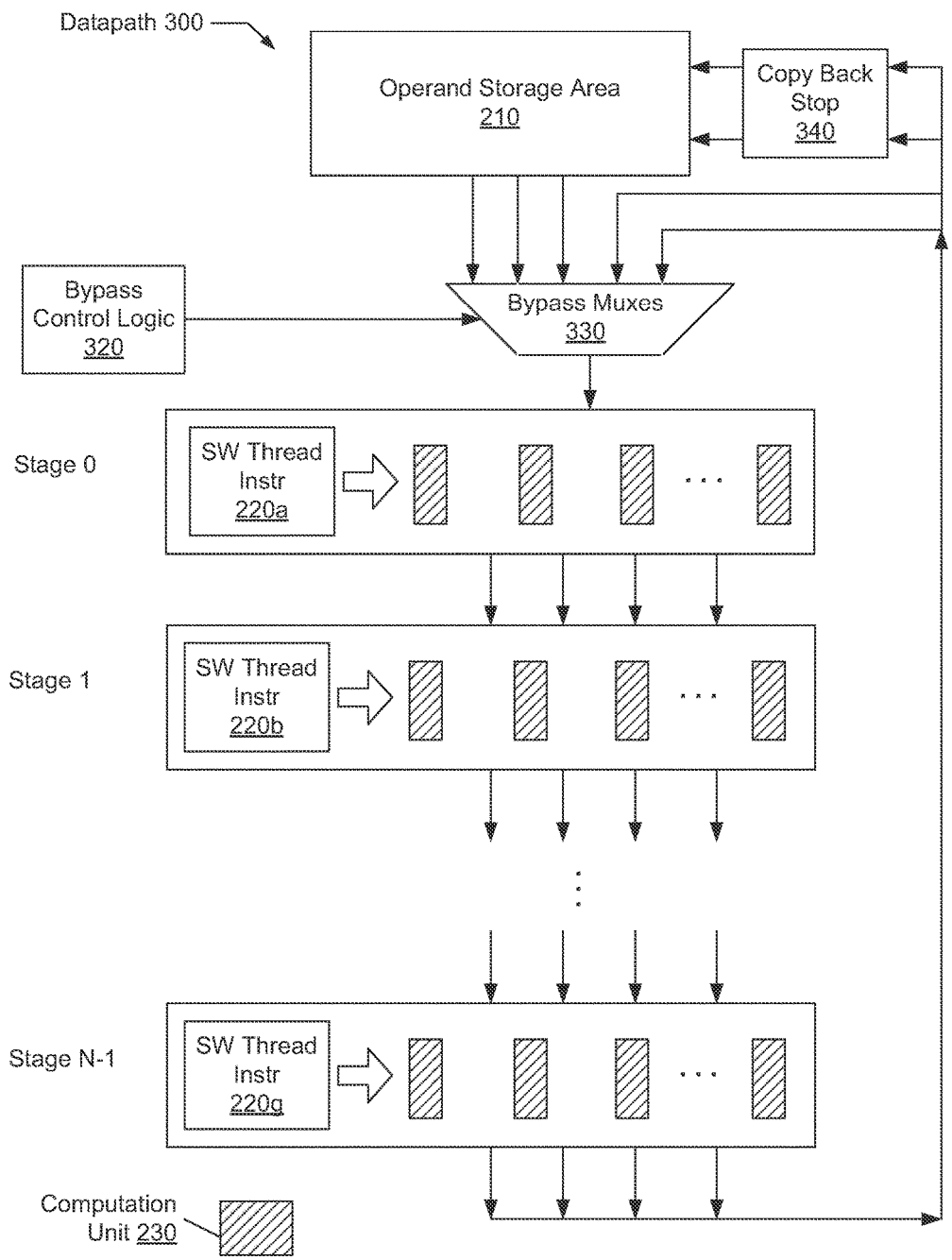
FIG. 3 is a generalized block diagram illustrating another embodiment of a SIMD parallel datapath.

Referring now to FIG. 3, a generalized block diagram illustrating another embodiment of a parallel datapath 300 is shown. Logic and circuit components used here that are described above are numbered identically. The datapath 300 includes one or more bypass muxes 330 between the operand storage area 210 and the first thread 0 in the pipeline. Data operands for an instruction of a given thread may be selected from either the operand storage area 210 or the results provided by a given stage of the one or more execution pipeline stages. The bypass control logic 320 may perform the selection. In one embodiment, the given stage is the last stage N-1 in the execution pipeline.

The bypass control logic 320 may determine whether one or more identifiers for operands to be read from the operand storage area 210 match one or more identifiers for results to be written to the operand storage area 210. The results may be conveyed from a given stage in the execution pipeline. In one embodiment, the given stage is the last stage N-1 in the execution pipeline. An instruction corresponding to the results may have entered the execution pipeline N cycles earlier. If one or more matching identifiers are found, then the one or more associated operands may be read from the bypass muxes 330, rather than from the operand storage area 210. The forwarded data includes one or more results from the youngest instruction of the older (in-program-order) instructions within a same thread. By foregoing a read from the RAM, less energy may be consumed to provide operands to instructions when the operands are from a prior instruction in a same thread. In addition, fewer read operations are performed in the operand storage area 210 which may reduce a number of dynamic stalls in the pipeline. For example, the operand storage area 210 may be banked and fewer read operations may reduce a probability of bank conflicts.

In one embodiment, a compiler may detect and mark data dependencies within a software application. This hint information may be used by the bypass control logic 320 to determine the selection of operand sources for an instruction in stage 0. In another embodiment, the hardware within the datapath 300 may compare identifiers of operands and detect data dependencies that are used by the bypass control logic 320.

In addition, a compiler may detect and mark a data operand within an instruction where the operand is last used. Generally, the program instructions may look similar to one of the following where the first listed value is a destination value:

ADD r3, r1, r2
SUB r4, r3(last), r5
ADD r8, r6, r7
SUB r8, r8, r9

As seen from the above, the value computed by the first instruction, an ADD instruction, for r3 may be bypassed to the second instruction, a SUB instruction with r4 as a destination identifier. The value computed for r3 by the first instruction may not be written to the operand storage area 210 since it is not used again and the compiler provides associated hint information. This hint information may be used by the copy back stop logic 340. The logic 340 may be used to prevent or cancel a write operation into the operand storage area 210. For example, a given result value conveyed from stage N-1 may be used by an instruction to be executed in thread 0. Using the above example, the computed value for r3 by the first ADD instruction may be conveyed from stage N-1. If it is known, such as an indication from compiler hint information, that the result value computed for r3 is last used by the SUB instruction, then the copy back stop logic 340 may cancel a write operation into the data operand storage area 210 for the computed result value.

The first ADD instruction may be within a thread identified by identifier (ID) 7 as an example. The second instruction, the SUB instruction, may also be within thread 7 and ready for execution in stage 0. Instructions from threads other than thread 7 may fill stages 1 to N-2. This given result value conveyed from stage N-1 in datapath 300 may be the last use of this given result value within the thread. Therefore, this given result value may be input into the bypass muxes 330 and selected by the bypass control logic 320. The stage 0 does not wait M cycles to read the given result value from the operand storage area 210. Since a read operation within the operand storage area 210 is not performed, both energy consumption and potential bank conflicts are reduced. Further, this given result value may have a write operation into the operand storage area 210 prevented from occurring by the logic 340 due to the last-use hint information from the compiler. Therefore, both energy consumption and storage space may be saved within the operand storage area 210 by having each of a read operation and a write operation from occurring.

In one embodiment, a number of clock cycles between a producer instruction and a consumer instruction may determine whether a given operand may receive a bypass data value. For example, if a fifth instruction (not shown) in the above code example uses the computed value r3, then this value may be written to the data operand storage area 210. The datapath 300 supports bypass of a result that is consumed by a younger instruction in-program-order. If a later instruction consumes the value r3, then the value r3 is not bypassed via the muxes 330 for this later instruction and the value is read from the data operand storage area 210.

Continuing with the above sample program code, either a compiler or hardware comparison logic may detect a computed value for r8 by the third instruction, which is an ADD instruction, is a last-use value within the fourth instruction, which is a SUB instruction. The fourth instruction overwrites the computed value for r8 by the third instruction. Therefore, the logic 340 may prevent a write operation for the r8 value computed by the third instruction, which is the ADD instruction. Again, both energy consumption and storage space are saved within the operand storage area 210.

In one embodiment, in order to keep the pipeline full, the datapath 300 may use N separate available threads, rather than N+M or more available threads as described above. If the operand storage area 210 utilizes 3 cycles for a read operation and 1 cycle for a write operation and the datapath 300 has 4 stages, then the datapath 300 may use 4 separate available threads to remove any stalls or pipeline bubbles. Accordingly, instruction latency is hidden. Similarly with datapath 200, in various embodiments, the datapath 300 may be a single-instruction-multiple-data (SIMD) datapath.

Figure 4:
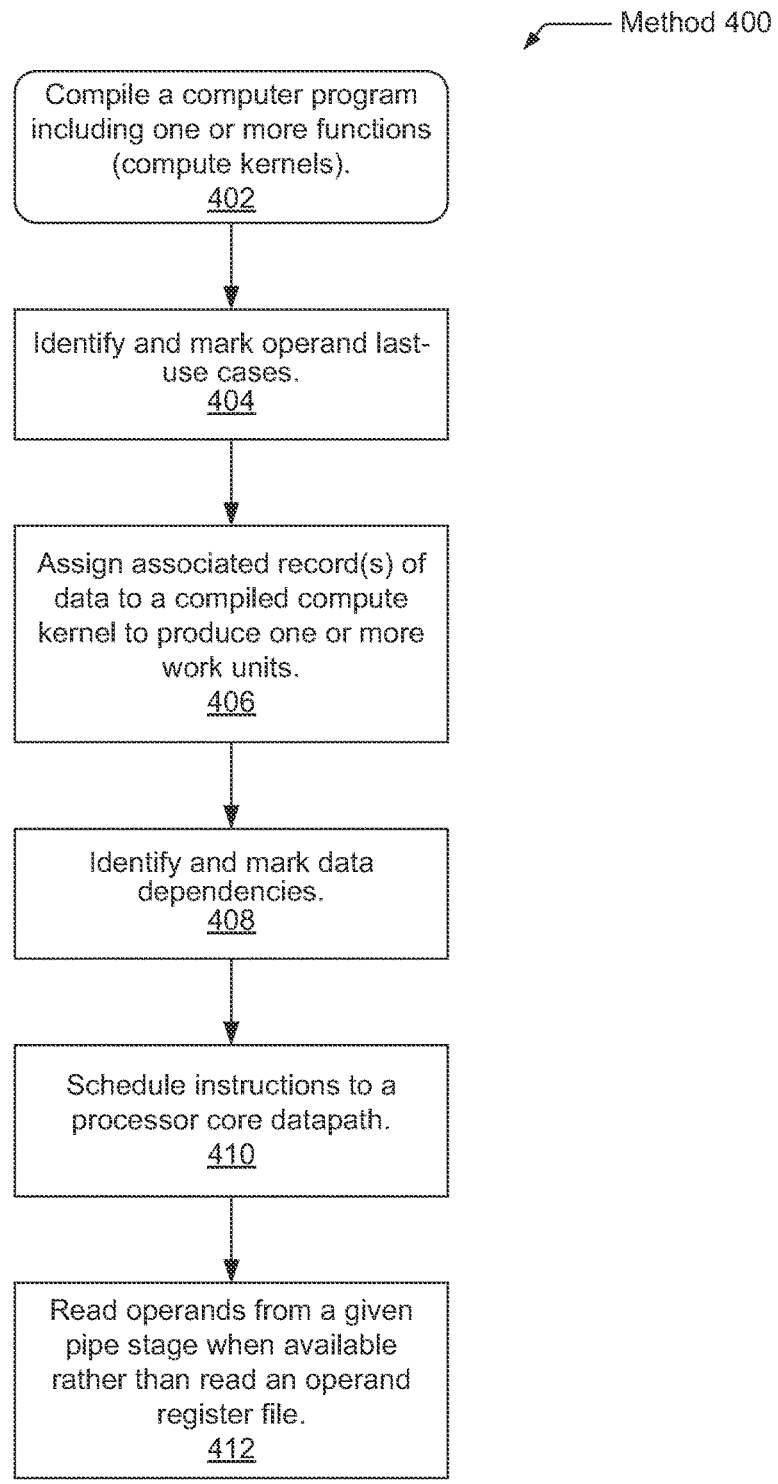
FIG. 4 is a generalized flow diagram illustrating one embodiment of a method for preparing instructions for result bypassing within a datapath.

Turning now to FIG. 4, one embodiment of a method 400 for bypassing results within a datapath is shown. In the example shown, bypass muxes (such as those shown in FIG. 3) are available for source operand forwarding. Later, in FIG. 6, an embodiment with a bypass cache (referred to as an "operand cache") is discussed. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 402, compilation of computer program may be performed during which various instructions, methods, functions, and so on, are analyzed. This computer program may be written for compilation and execution of a parallel-data application, such as in the gaming, business, medical and other fields. Program code or instructions may refer to any portion of a software application, subroutine, dynamic linked library, or otherwise. The program code may be written in a high-level programming language such as C, a C-like language such as OpenCL™, Stream C, C++, Java, a low level programming language (e.g., machine code or assembly), or any combination of the above.

In one embodiment, program source code is statically compiled. In such an embodiment, during a static front-end compilation, the source code may be translated to an intermediate representation (IR). A back-end compilation step may translate the IR to machine code. The static back-end compilation may perform more transformations and optimizations. In another embodiment, the source code is compiled with a Just-In-Time (JIT) method. The JIT method may generate an appropriate binary code after obtaining the system configuration. With either method, the compiler may identify a compute kernel in the program code.

In one embodiment, a processor core with a SIMD parallel datapath is a coprocessor for a general-purpose processor. In such an embodiment, the general-purpose processor performs host duties including compiling the source code. In block 404, the compiler may read one or more instructions of program code (e.g., instructions corresponding to a computer kernel or otherwise) and analyze them. The compiler may identify and mark operand value last-use cases. In one embodiment, the identifying marks may include static encodings.

In block 406, one or more associated record(s) of data may be assigned to a compiled compute kernel to produce one or more work units. Data streams may be routed to a stream register file, such as operand storage area 210. A streaming memory system may transfer entire data streams between the operand storage area 210 and RAM. The compute kernel may include a large number of very large instruction word (VLIW) instructions, which are stored in a RAM within a microcontroller or a system-on-a-chip (SOC). The microcontroller or SOC issues the instructions to the processor core with a SIMD datapath.

In block 408, data dependencies are identified and marked. In one embodiment, the compiler detects the data dependencies and encodes them within the instructions. In another embodiment, hardware within a processor detects the data dependencies and marks them. In addition, register renaming may be performed on both the source and destination operands. The data dependency identification, marking, and register renaming may occur prior to sending particular instructions from the general-purpose datapath to the SIMD datapath. In other embodiments, hardware within the SIMD datapath performs these actions. Additionally, the detection, marking, and possible renaming may occur when work units are scheduled or when the work units are actually being executed. In one embodiment, hardware determines data dependencies by comparing particular fields within instructions. These fields may include at least destination/result identifiers (IDs), thread IDs, and so forth. Further, the hardware may compare these fields for an instruction entering the execution pipeline and another instruction completing a given stage of the one or more execution pipeline stages. In one embodiment, the given stage is the last stage, N−1, of the execution pipeline.

In block 410, the work units may be scheduled to a processor core with a single-instruction-multiple-data (SIMD) parallel datapath. In one embodiment, multiple threads may be scheduled to execute on the SIMD datapath and instructions from separate available threads may be interleaved within a pipeline in the SIMD datapath in order to hide instruction latency.

In block 412, a source operand for a given instruction may be read from a given pipeline stage in response to detecting the source operand is available from the given pipeline stage. In one example, another instruction is being processed in the given pipeline stage and this instruction produces the source operand as its destination operand. In another example, this instruction uses the same source operand as the given instruction and has the source operands stored in a pipeline stage register.

In various embodiments, as the given instruction begins processing in the first pipeline stage, stage 0, the source operand for the given instruction may be available in the later given pipeline stage. In one embodiment, the later given pipeline stage is the last pipeline stage in the pipeline, or stage N−1 as shown in the datapath 300. In another embodiment, in response to control logic detecting the source operand is currently in an earlier pipeline stage than the given pipeline stage, the given instruction may be stalled and consequently held in pipeline stage 0 until the source operand becomes available in the given pipeline stage. In cases where the source operand is read from the given pipeline stage rather than from an operand register file, power consumption may be reduced. Reduced power consumption may in turn extend the battery life of devices that utilize a battery.

Figure 5:
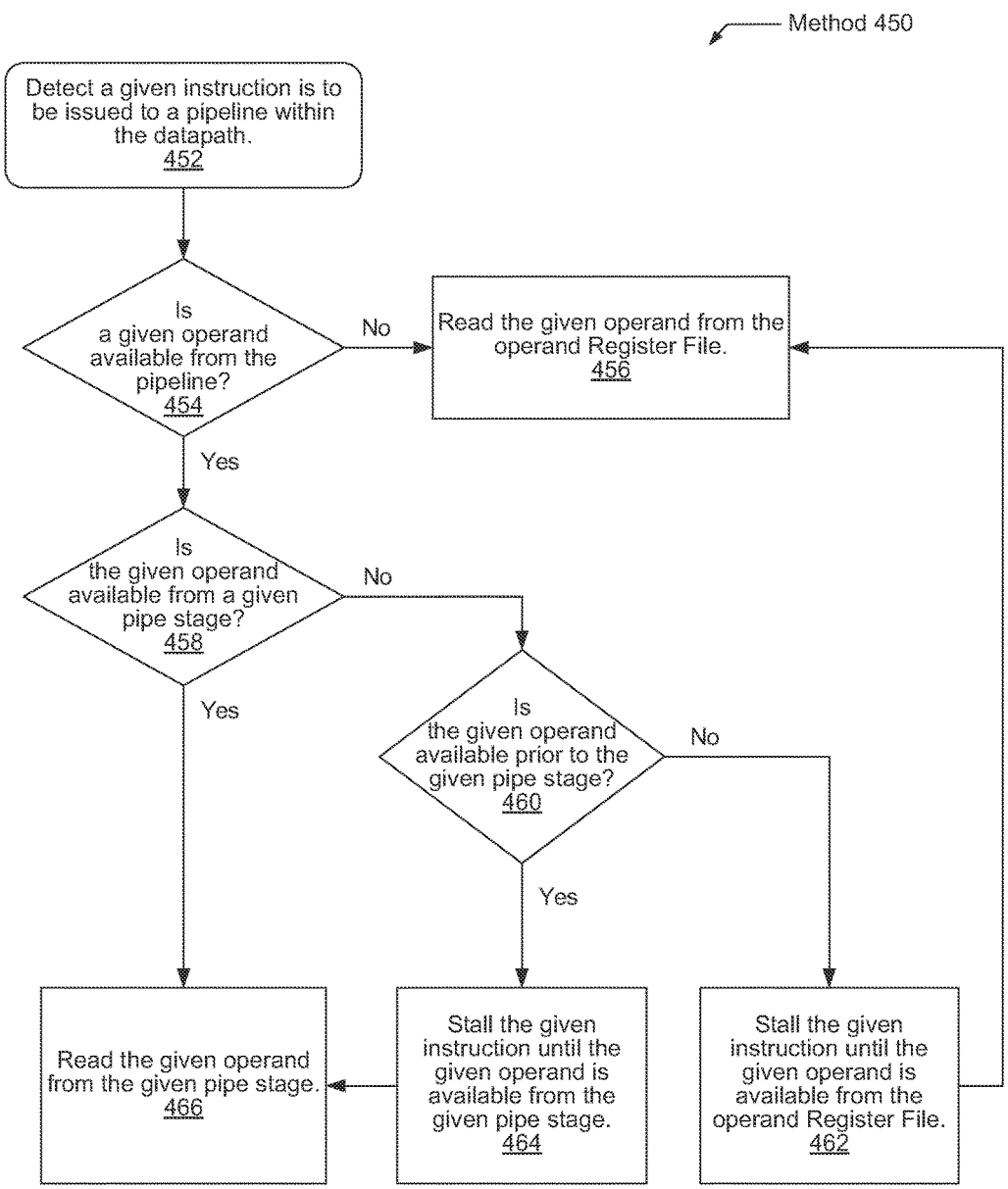
FIG. 5 is a generalized flow diagram illustrating one embodiment of a method for result bypassing within a SIMD parallel datapath.

Turning now to FIG. 5, one embodiment of a method 450 for bypassing results within a datapath is shown. In the example shown, bypass muxes (such as those shown in FIG. 3) are available for data (e.g., source operand) forwarding. Later, embodiments including an operand cache are discussed. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 452, instructions are executed on the processor core and a given instruction is detected to be issued to a pipeline for execution the datapath. For example, referring again to FIG. 3, the given instruction may be issued to pipeline stage 0 of the datapath 300. For the given instruction, one or more operands may be detected to be available from a given pipeline stage in the datapath (conditional block 454). For example, another instruction producing the one or more operands for the given instruction may be in the given pipeline stage, such as the last pipeline stage, or pipeline stage N−1. However, if control logic determines a source operand for the given instruction is not available from the pipeline (conditional block 454), then in block 456 the operand may be read from a register file. Otherwise, in cases where the source operand for the given instruction is determined to be available from the pipeline, control logic may determine whether the source operand is available in the given pipeline stage. In one embodiment, the given pipeline stage is the last pipeline stage, or pipeline stage N−1 as shown in datapath 300. However, in other embodiments, a different pipeline stage within the pipeline may be the given pipeline stage.

If the given source operand is not available from the given pipeline stage (conditional block 458) and is not available from a pipeline stage prior to the given pipeline stage (conditional block 460), then in block 462 the given instruction may be stalled until the given operand is available from the operand register file. In one embodiment, instructions from other threads may be issued for execution while the given instruction is stalled. For example, data dependencies may have indicated a data dependency within the pipeline— though the source operand is not yet within the last stage. In such a case, the operand may be read from the register file (block 456). In various embodiments, the read operation for the register file may be a multi-cycle operation and may consume a relatively large amount of power. an appreciable amount of power may be consumed when the register file is read. It is noted that in various embodiments block 454 shown in FIG. 5 may not be present. Rather, the method may proceed directly from block 452 to block 458 where a check is performed to determine if the operand is available in the given pipeline stage. Additionally, in some embodiments, actions described in both of blocks 458 and 460 may be performed concurrently (i.e., check multiple stages of the pipeline simultaneously to determine if and where the operand may be available). Additionally, in some embodiments, a source operand may be forwarded (e.g., via bypass muxes) when ready rather than being read from the operand register file. Numerous such options are possible and are contemplated.

In cases where a given source operand is not available from the given pipeline stage (conditional block 458), but it is available from a pipeline stage prior to the given pipeline stage (conditional block 460), then in block 464 the given instruction in may be stalled until the given operand is available from the given pipeline stage. Subsequently, in block 466 the given source operand may be read from the given pipeline stage. If in block 458 the given source operand is available from the given pipeline stage, then control flow of method 450 moves to block 466 and the given source operand may be read from the given pipeline stage via the bypass muxes. Whether the given source operand is read from the muxes or from the operand register file, there may be a delay while the given instruction waits for the given source operand to be produced and ready.

Figure 6:
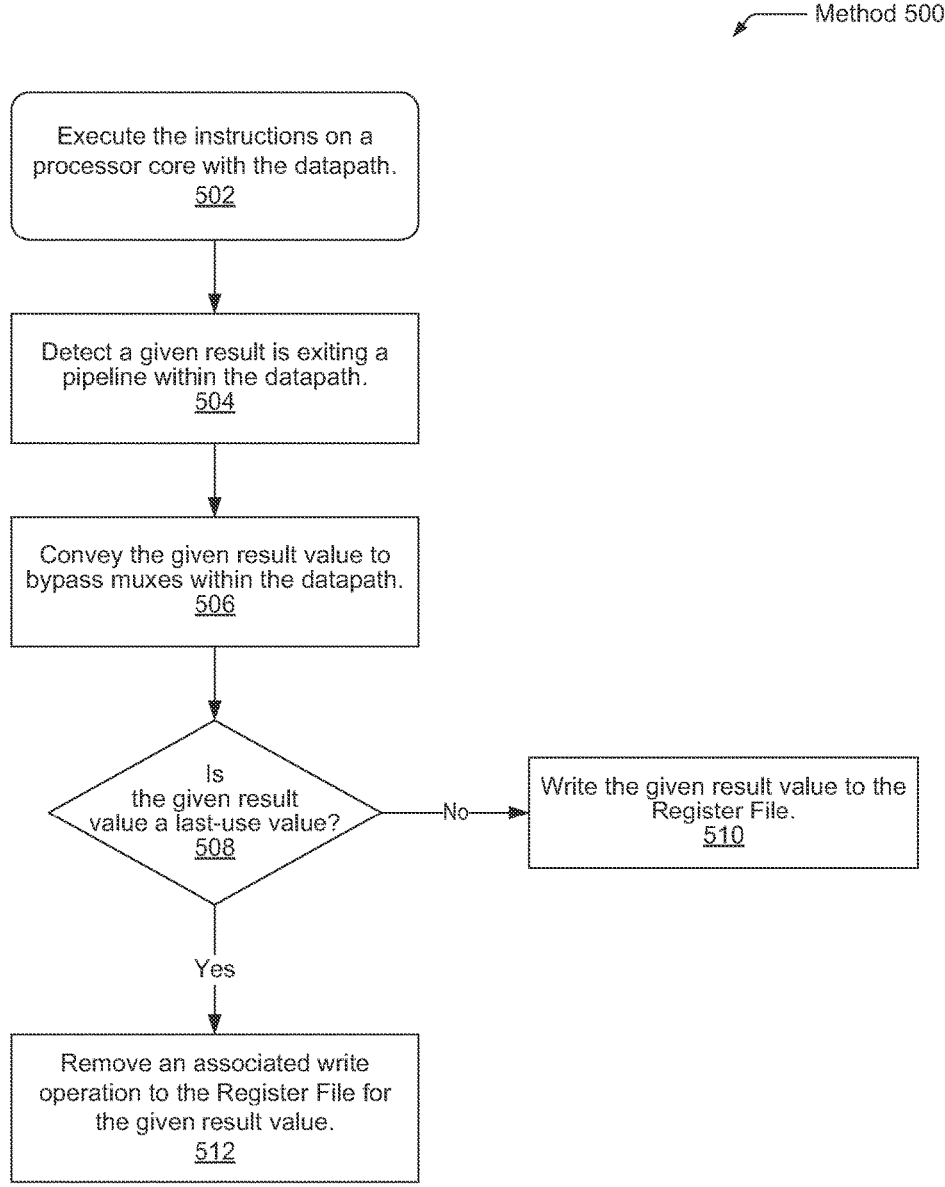
FIG. 6 is a generalized flow diagram illustrating one embodiment of a method for storing results within a datapath.

Turning now to FIG. 6, one embodiment of a method 500 for storing results within a datapath is shown. In various embodiments, the datapath may be a SIMD parallel datapath. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 502, instructions are issued to a pipeline for execution within a datapath. The mechanisms for compiling and scheduling both instruction streams and data streams for a data-parallel application may be performed as described earlier. In block 504, a given result is detected to reach a given stage within the execution pipeline. In one embodiment, the given results are detected to be exiting a pipeline. In block 506, the given result value may be conveyed to bypass muxes.

If the given result value is not marked as a last-use value (conditional block 508), then in block 510 the given result value is written to the register file. However, if the given result value is marked as a last-use value (conditional block 508), then in block 512, an associated write operation to the register file for the given result value may be removed or squashed.

In one embodiment, a compiler determines whether the given result value is a last-use value. The compiler may encode the operand identifier to indicate the last-use property. In one embodiment, the compiler may further determine the given result value is consumed by an instruction immediately following another instruction that produced the given result value. In another embodiment, hardware in the datapath determines whether a result operand value is consumed for a final time by an instruction immediately following another instruction that produced the given result value. One example is the subtraction instruction used in an earlier example, such as SUB r8, r8, r9. If this determination is true, then the hardware in the datapath may squash an associated write operation to the register file. If this determination is false, then the hardware in the datapath may allow an associated write operation to proceed. However, if the hardware in the datapath supports bypass of data operands beyond one instruction in-program-order, then each write operation associated with a last-use value may be squashed. Further details are provided below.

Figure 7:
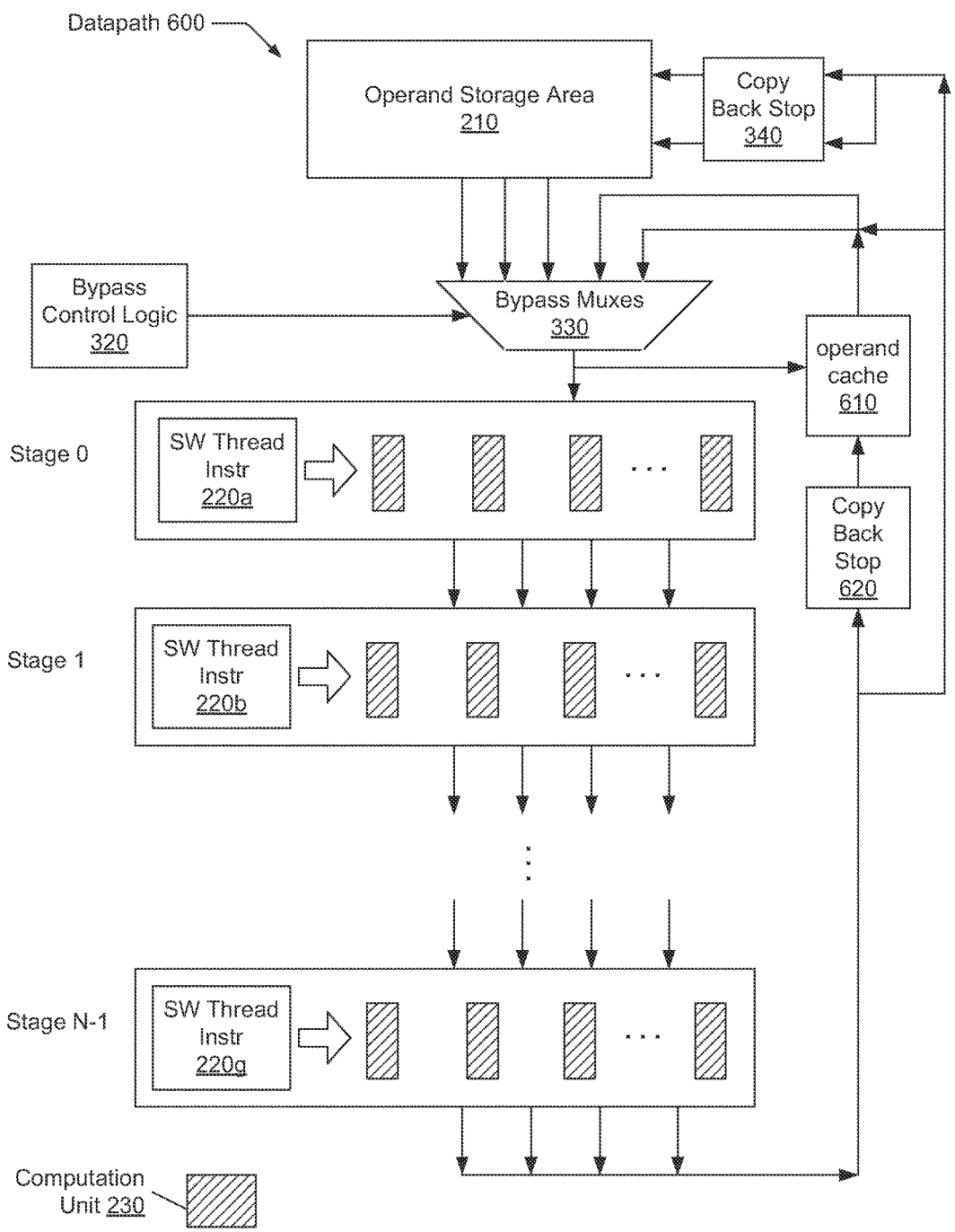
FIG. 7 is a generalized flow diagram illustrating yet another embodiment of a datapath.

Turning now to FIG. 7, a generalized block diagram illustrating yet another embodiment of a datapath 600 is shown. Logic and circuit components used here that are described above are numbered identically. In various embodiments, the datapath 600 may be a SIMD parallel datapath. Similar to datapaths 200 and 300, the datapath 600 may be included on a processor with at least one core that executes instructions of a general-purpose instruction set architecture (ISA) and a second core that executes instruction extensions to an existing ISA or a different ISA. For example, a general-purpose processor may also execute multimedia instructions. The multimedia instructions may be SIMD instructions and a scheduler may determine which datapath receives a given instruction ready to issue. Similarly, each of the datapaths 200-600 may be included in an integrated circuit (IC) die on a system-on-a-chip (SOC).

In the embodiment shown, datapath 600 includes an operand cache 610. In one embodiment, the operand cache 610 is a smaller storage area than the operand storage area 210. The operand cache 610 also consumes less energy for accesses than the operand storage area 210. In one embodiment, the operand storage area 210 is a RAM and the operand cache 610 uses D flip-flops for storing results conveyed from stage N−1. In another embodiment, the operand cache 610 may utilize other storage technologies such as a small cache that consumes less power for accesses than the operand storage area 210. As shown, the operand cache 610 may receive operand data from at least one stage, such as stage N−1. In one embodiment, a copy back stop block 620 may be used to filter operand data received by the operand cache 610 from the given stage. In one embodiment, the received operand data may include produced results associated with a destination operand. Additionally, the operand cache 610 may receive operand data from the operand storage area 210 via the bypass muxes 330. The operand data received via the bypass muxes 330 may include source operands identified as source operands frequently used by younger (in-program-order) instructions. A compiler-set hint bit may be used to provide an indication of this frequent subsequent use.

In one embodiment, the compiler is configured to determine a given source operand in a given instruction may be used multiple times by subsequent instructions. Additionally, the compiler may be configured to set a hint bit associated with the instruction. If the compiler determines that an operand being fetched from the operand storage area 210 will be used multiple times by subsequent instructions, it can set a hint bit in the instructions (or otherwise associated with the instruction) to write the operand to the operand cache 610. Therefore, subsequent instructions may fetch the given source operand from the operand cache 610, rather than from the operand storage area 210. In various embodiments, each entry within the operand cache 610 may further indicate whether the corresponding data has been modified (e.g., by using a modified/unmodified bit). Unmodified data operands may then simply be discarded when evicted, rather than written back to the operand storage area 210.

In addition to the above, source operands may be prefetched from the operand storage area 210 and stored in the operand cache 610 before an instruction uses the source operands. In some embodiments, an ISA includes an instruction encoding that permits a given instruction to specify and fetch a given operand, wherein the given operand is not used during execution of the given instruction. Rather, the given operand may be used in a subsequent instruction and the given instruction performs an operand prefetch of the given operand. This given instruction normally uses less than a maximum number of operand identifiers. Again, the compiler can set a hint bit in this given instruction (or otherwise associated with the given instruction) to fetch the given operand and write the given operand to the operand cache 610. A code example is listed below with program instructions listing a destination operand first:

| ADD | r1, r2, r3; r8 | // Prefetch the operand r8 and place // it in the operand cache. |
| ADD | r4, r4, r8 | // Fetch the operand r8 from the // operand cache. |

Although the above addition instructions are shown back-to-back, multiple instructions may be between the two addition instructions. The compiler may select a first instruction for prefetching an operand that is a certain number of instructions prior in-program-order of a second instruction that uses the operand. In some cases, when utilizing the encoding and hint bit for the first instruction, the compiler analysis determines the operand is already in the operand storage area 210. In other cases, the compiler analysis may determine the operand is not yet placed in the operand storage area 210. Accordingly, the compiler may select the first instruction for prefetching a larger number of instructions prior in-program-order to the second instruction to allow sufficient latency for the load of the operand from a lower-level memory.

In some embodiments, the above technique may be used when the second instruction utilizes an operand (r8) that is mapped to a same bank or other division of storage with another operand (r4) in the second instruction. In such cases, without prefetching, the second instruction may have an appreciable latency while an operand (r8) is fetched from a lower-level memory due to the collision with the other operand (r4) within the operand storage area 210. Bank collisions within the operand storage area 210 may be reduced in these various embodiments, since the given source operand is not fetched from the operand storage area 210 when the given instruction is being processed.

The operand cache 610 may be queried during an operand lookup pipeline stage. In one embodiment, the bypass muxes 330 receive inputs from each of the following sources: the operand storage area 210, the operand cache 610 and the output of a given stage, such as stage N−1. The bypass control logic 320 may determine which operand input(s) to the bypass muxes 330 are selected for processing in the pipeline stage 0. In one embodiment, the bypass control logic 320 may determine whether a match exists between thread IDs and identifiers for operands to be read from the operand storage area 210 and thread IDs and identifiers for results produced by a given stage, such as stage N−1.

In addition, the bypass control logic 320 may determine whether these identifiers for operands to be read from the operand storage area 210 match identifiers for operands stored in the operand cache 610. If one or more matches are found, then the one or more associated operands may be selected for reading from an associated source (stage N−1 or the operand cache 610). These particular data operands are not read from the operand storage area 210. The forwarded data may include one or more results from older (in-program-order) instructions within a same thread. Alternatively, the forwarded data may include source operands with unmodified data stored in the operand cache 610, wherein these source operands are identified with compiler-generated hint bits In this manner, less energy is consumed to provide operands to instructions when the operands are produced by a prior instruction in a same thread.

When the operand cache 610 becomes full or when a given number of cycles have elapsed, one or more modified operands may be sent to the copy back stop logic 340. If the results do not have an associated write operation squashed by the copy back stop logic 340, then the results are written to the operand storage area 210.

In another embodiment, the datapath 600 may include copy back stop logic 620, which determines earlier that a given result may have an associated write operation canceled. The result may not be stored in either the operand cache 610 or the operand storage area 210. Alternatively, the result may be written to the operand cache 610 for operand bypass at a later time, but the result is not written to the operand storage area 210. For example, a given result for a data operand may be stored in the operand cache 610. At a later time before this given result is removed from the operand cache, a different value may replace the given result. The replacement mechanism prevents the given result from being written back into the operand storage area. Otherwise, at a later time, the given result may be selected as a victim within the operand cache and it is written into the operand storage area. The connections in datapath 600 may be used to implement the operand cache as a write-through or a write-back cache depending on design trade-offs.

In one embodiment, the operand cache 610 may be organized as a fully associative storage. In an alternative embodiment, the storage within the operand cache 610 may be allocated for a given thread. In yet another embodiment, the storage within the operand cache 610 may be a mix of fully associative and directly allocated storage.

The storage configuration of the operand cache 610 may depend on optimal design choices, which may be found from modeling simulations, circuit tradeoff simulations, and so forth. Similarly, the capacity of the operand cache 610 may be determined with simulations. The operand cache 610 may hold a number R of results or prior instruction operands, wherein R is an integer. Alternatively, the operand cache 610 may store a number R of results or prior instruction operands for each of number T active threads, wherein T is an integer.

Determining whether an associated write operation is canceled for a last-use operand value may be performed by the compiler, which may encode an indication, or by hardware logic in the datapath 600. An example for hardware logic to determine a last-use of a data result may be shown below.

```
ADD r7, r12, r13 // data result produced
ADD r4, r6, r7 // first use
SUB r5, r7, r10 // second use
SUB r3, r14, r18 // no use
ADD r6, r3, r7 // last use
SUB r9, r6, r4 // no use
ADD r7, r9, r5 // data result overwritten
```

As can be seen from the above, a data result is generated and designated to be stored in the register ID r7. This data result is consumed in the subsequent two instructions. A fourth instruction later in the computer program, the data result is consumed a last time. The data result is overwritten with a new value in the last instruction shown above. The hardware may determine with comparisons of operand and destination/result IDs when a last-use occurs for a given data result. Accordingly, the hardware may cancel a write operation to the operand storage area for the data result generated in the first instruction in the above example. The updated result generated by the last instruction in the above example may be written instead to the operand storage area. Alternatively, this updated value may have a corresponding write operation canceled if yet another overwrite is found by the hardware while the updated data result is held in the operand cache.

The distance between producer and consumer instructions for canceling write operations to the operand cache 610 and/or the operand storage area 210 may depend on the size of the operand cache 610 and a number of results or prior instruction operands for a given thread allowed to be stored in the operand cache 610. Since data operands may be read from the operand cache 610 instead of the operand storage area 210, the energy consumption of the datapath 600 may be reduced. Further, the number of data operands read from the operand storage area 210 may be reduced, which may reduce a probability of bank conflicts within the operand storage area 210.

In various embodiments, a determination of whether to write a result into the operand cache 610 or write the result into the operand storage area 210 while bypassing the operand cache 610 may be based on at least the distance between the producer and the consumer instructions. The next use of a data operand may be sufficiently close to the producer instruction to allow the data operand to be read from the operand cache 610 for the consumer instruction. The data operand may be written into the operand cache 610 during processing of the producer instruction.

It is noted that the size of the operand cache 610 may (at least in part) be used to determine whether a distance between a producer and a consumer instruction is deemed relatively near or far. For example, the next use of a data operand may be sufficiently far from the producer instruction to reduce the possibility of finding the data operand in the operand cache 610 to below an acceptable level. In such cases the data operand may have already been replaced by other results. In this case, the data operand may bypass the operand cache 610 and be written into the operand storage area 210. The bypass of the operand cache 610 may prevent an extra write operation into the operand cache 610 with a result that is unlikely to be used. Additionally, a subsequent read of the operand cache 610 during victim selection may be avoided.

Figure 8:
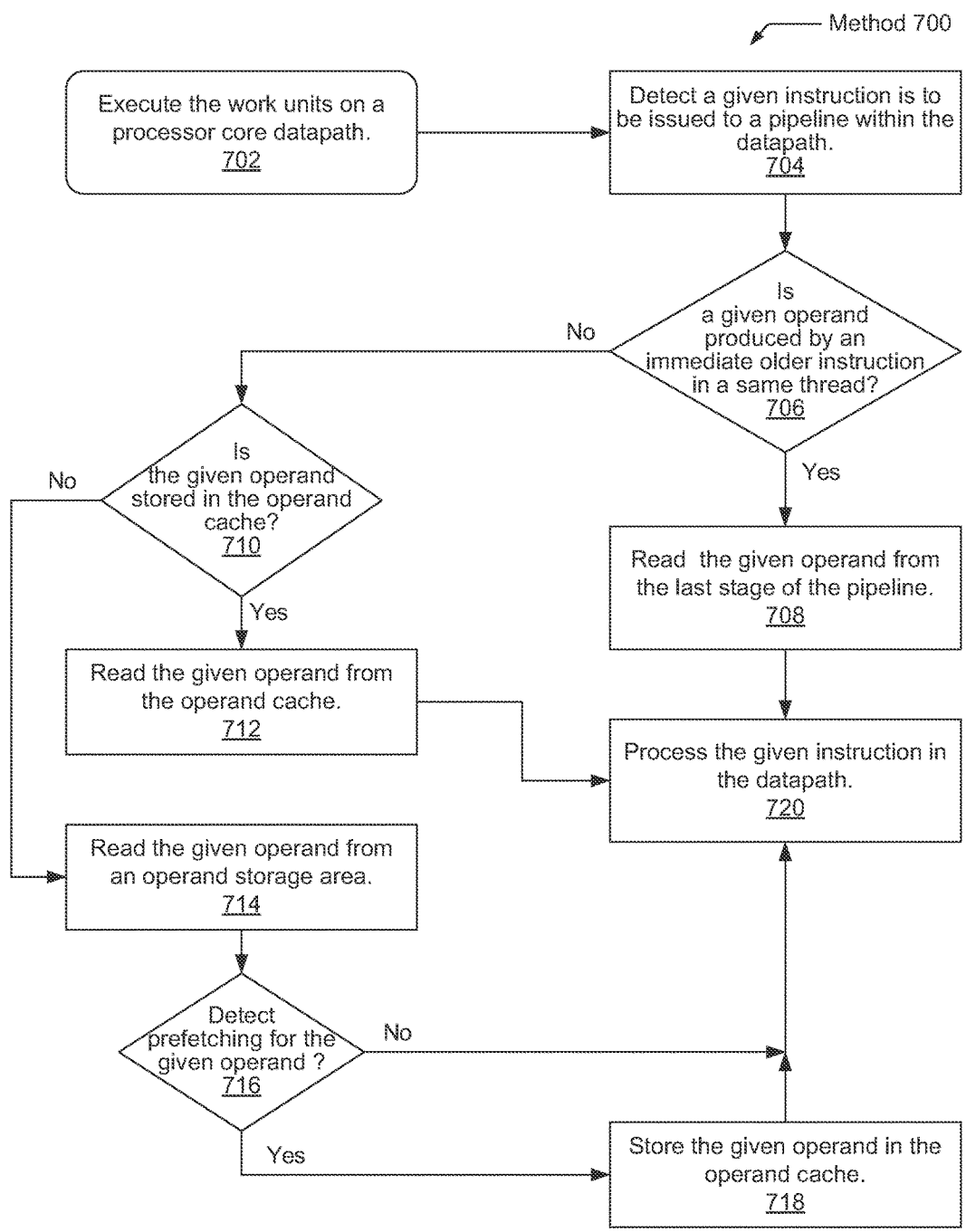
FIG. 8 is a generalized flow diagram illustrating one embodiment of a method for providing operands within a datapath.

Turning now to FIG. 8, a generalized flow diagram illustrating one embodiment of a method 700 for providing operands within a datapath is shown. Again, in various embodiments, the datapath may be a SIMD parallel datapath. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 702, instructions are issued to a pipeline for execution within a datapath. The mechanisms for compiling and scheduling both instruction streams and data streams for a data-parallel application may be performed as described earlier. In block 704, a given instruction is detected to be issued to a pipeline within the datapath. Data dependencies within a given window of the program code may be determined by a compiler and/or by hardware comparison logic in the datapath. At least thread IDs and operand identifiers may be used for comparisons to determine whether the given source operand is in the operand cache. Within a same thread, if a given source operand is produced by an immediate older (in-program-order) instruction (conditional block 706), then in block 708, the given source operand may be read from the last stage of the pipeline within the SIMD datapath. For example, the given source operand may be received via the bypass muxes as shown in datapath 600.

If the given source operand is not produced by the immediate older (in-program-order) instruction within the same thread (conditional block 706), then the operand cache may be accessed for source operands. If the given source operand is determined to be in the operand cache (conditional block 710), then in block 712, the given source operand is read from the operand cache, which is smaller than the operand storage area. Otherwise, in block 714, the given source operand may be read from the operands storage area. When the given source operand is read from the operand storage area, a compiler-set hint bit may indicate the given source operand is to be prefetched for subsequent instructions in the program. If prefetching for the given operand is detected (conditional block 716), then in block 718, the given source operand is stored in the operand cache. In block 720, the given instruction is processed in the processor datapath.

In various embodiments, there may not be an explicit check for whether an operand is produced by an older in-program-order instruction. Rather, the operand cache and the last pipeline stage may simply be checked (e.g., concurrently) for availability of a source operand. If the operand is available, it may be selected for use rather than reading from the register file.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
    a data operand register file;
    one or more execution pipeline stages;
    an operand cache configured to store data results conveyed by the one or more execution pipeline stages; and
    control logic, wherein the control logic is configured to:
        select a source for a data operand of an instruction from the operand cache or a given stage of the pipeline, in response to determining the data operand is available in the operand cache or the given stage of the pipeline;
        select a source for a data operand of an instruction from the data operand register file, in response to determining the data operand is not available in either the operand cache or the given stage of the pipeline;
        write a result of a producer instruction into the operand cache from the one or more execution pipeline stages when a distance between the producer instruction and a consumer instruction is less than a given distance, wherein the distance is measured as a number of instructions in-program-order between the producer instruction and the consumer instruction; and
        prevent writing the result into the operand cache and write the result into the data operand register file when the distance is greater than the given distance.

2. The apparatus as recited in claim 1, wherein the operand cache stores data comprising one or more of result data conveyed by producer instructions and data conveyed from the operand register file prior to the one or more execution pipeline stages.

3. The apparatus as recited in claim 1, wherein in response to determining a data result is selected to be removed from the operand cache, the control logic is further configured to:
    prevent the data result from being written into the data operand register file, in response to determining the data result stored in the operand cache is marked with a last-use indication that indicates a last consumer instruction of the data result is within a number of instructions of an instruction that produces the data result; and
    write the data result into the data operand register file, in response to determining the data result is not marked with the last-use indication.

4. The apparatus as recited in claim 1, wherein the given distance is based on a size of the operand cache.

5. The apparatus as recited in claim 1, wherein the control logic is further configured to store a data value read from the register file in the operand cache, in response to detecting a hint that the data value is to be prefetched for a subsequent instruction.

6. The apparatus as recited in claim 1, wherein said result of the producer instruction is written into the operand cache when the producer instruction is in the last stage of the pipeline.

7. The apparatus as recited in claim 3, wherein each stage of the one or more execution pipeline stages executes an instruction of a thread different from another thread in any other stage of the one or more execution pipeline stages.

8. The apparatus as recited in claim 1, wherein the given distance is based on a number of results permitted to be stored in the operand cache for an associated thread of a plurality of threads.

9. A method comprising:
    storing data results conveyed by one or more execution pipeline stages of a pipeline in an operand cache;
    selecting a source for a data operand of an instruction from the operand cache or a given stage of the one or more execution pipeline stages of the pipeline, in response to determining the data operand is available in the operand cache or the given stage of the pipeline;
    selecting a source for a data operand of an instruction from the data operand register file, in response to determining the data operand is not available in either the operand cache or the given stage of the pipeline;
    writing a result of a producer instruction into the operand cache from the one or more execution pipeline stages when a distance between the producer instruction and a consumer instruction is less than a given distance, wherein the distance is measured as a number of instructions in-program-order between the producer instruction and the consumer instruction; and
    preventing writing the result into the operand cache and writing the result into the data operand register file when the distance is greater than the given distance.

10. The method as recited in claim 9, wherein in response to determining a data result is selected to be removed from the operand cache, the method further comprises:
    preventing the data result from being written into the data operand register file, in response to determining the data result stored in the operand cache is marked with a last-use indication that indicates a last consumer instruction of the data result is within a number of instructions of an instruction that produces the data result; and
    writing the data result into the data operand register file, in response to determining the data result is not marked with the last-use indication.

11. The method as recited in claim 9, further comprising storing a data value read from the register file in the operand cache, in response to detecting a hint that the data value is to be prefetched for a subsequent instruction.

12. The method as recited in claim 11, in response to receiving last-use hint information from a compiler for a third data result, further comprising canceling a write of the first data result to the data operand register file.

13. The method as recited in claim 11, further comprising storing data results conveyed by only the operand cache to the data operand register file.

14. The method as recited in claim 11, further comprising executing a maximum number of different threads equal to a number of the one or more execution pipeline stages.

15. The method as recited in claim 14, further comprising executing single-instruction-multiple-data (SIMD) instructions in the one or more execution pipeline stages.

16. The method as recited in claim 9, further comprising storing data in the operand cache comprising one or more of result data conveyed by producer instructions and data conveyed from the operand register file prior to the one or more execution pipeline stages.

17. A processor comprising:
- a first execution core configured to execute general-purpose instructions;
- a second execution core comprising one or more pipeline stages of a pipeline;
- a scheduler configured to issue a given instruction either to the first or to the second execution core;
- wherein the second execution core is configured to:
  - store data results conveyed one or more execution pipeline stages of the pipeline in an operand cache;
  - select a source for a data operand of an instruction from the operand cache or a given stage of the one or more execution pipeline stages, in response to determining the data operand is available in the operand cache or the given stage of the pipeline; and
  - select a source for a data operand of an instruction from a data operand register file, in response to determining the data operand is not available in either the operand cache or the given stage of the pipeline;
  - write a result of a producer instruction into the operand cache from the one or more execution pipeline stages when a distance between the producer instruction and a consumer instruction is less than a given distance, wherein the distance is measured as a number of instructions in-program-order between the producer instruction and the consumer instruction; and
  - prevent writing the result into the operand cache and write the result into the data operand register file when the distance is greater than the given distance.

18. The processor as recited in claim 17, wherein the operand cache stores data comprising one or more of result data conveyed by producer instructions and data conveyed from the operand register file prior to the one or more execution pipeline stages.

19. The processor as recited in claim 17, wherein in response to determining a data result is selected to be removed from the operand cache, the second execution core is further configured to:
- prevent the data result from being written into the data operand register file, in response to determining the data result stored in the operand cache is marked with a last-use indication that indicates a last consumer instruction of the data result is within a number of instructions of an instruction that produces the data result; and
- write the data result into the data operand register file, in response to determining the data result is not marked with the last-use indication.

20. The processor as recited in claim 19, wherein the data operand register file stores data results conveyed by only the operand cache.

21. The processor as recited in claim 17, wherein the second execution core is further configured to store a data value read from the register file in the operand cache, in response to detecting a hint that the data value is to be prefetched for a subsequent instruction.

22. The processor as recited in claim 21, wherein each stage of the one or more execution pipeline stages executes an instruction of a thread different from another thread in any other stage of the one or more execution pipeline stages.

23. The processor as recited in claim 17, wherein the one or more execution pipeline stages execute single-instruction-multiple-data (SIMD) instructions.

24. The processor as recited in claim 22, wherein the data operand register file is a banked random access memory (RAM).

25. A system-on-a-chip (SOC) comprising:
- a first integrated circuit (IC) die configured to execute general-purpose instructions;
- a second IC die comprising one or more pipeline stages of a pipeline;
- a system controller configured to issue a given instruction either to the first or to the second IC die;
- wherein the second IC die is configured to:
  - store data results conveyed by one or more execution pipeline stages in an operand cache;
  - select a source for a data operand of an instruction from the operand cache or a given stage of the one or more execution pipeline stages, in response to determining the data operand is available in the operand cache or the given stage of the pipeline; and
  - select a source for a data operand of an instruction from a data operand register file, in response to determining the data operand is not available in either the operand cache or the given stage of the pipeline;
  - write a result of a producer instruction into the operand cache from the one or more execution pipeline stages when a distance between the producer instruction and a consumer instruction is less than a given distance, wherein the distance is measured as a number of instructions in-program-order between the producer instruction and the consumer instruction; and
  - prevent writing the result into the operand cache and write the result into the data operand register file when the distance is greater than the given distance.

* * * * *